(12) United States Patent
Van Delden et al.

(10) Patent No.: US 12,445,005 B2
(45) Date of Patent: Oct. 14, 2025

(54) ELECTRIC STATOR FOR AN EXPANSION VALVE

(71) Applicant: Mahle International GmbH, Stuttgart (DE)

(72) Inventors: Jeffrey Van Delden, Stuttgart (DE); Matthias Lindenberg, Stuttgart (DE); Florian Wetzel, Baltmannsweiler (DE)

(73) Assignee: Mahle International GmbH (DE)

( * ) Notice: Subject to any disclaimer, the term of this patent is extended or adjusted under 35 U.S.C. 154(b) by 457 days.

(21) Appl. No.: 17/541,217

(22) Filed: Dec. 2, 2021

(65) Prior Publication Data

US 2022/0181939 A1 Jun. 9, 2022

(30) Foreign Application Priority Data

Dec. 3, 2020 (DE) .................... 10 2020 215 269.1

(51) Int. Cl.
*H02K 3/28* (2006.01)
*H02K 1/16* (2006.01)
*H02K 3/12* (2006.01)
*H02K 5/02* (2006.01)

(52) U.S. Cl.
CPC ............... *H02K 3/28* (2013.01); *H02K 1/165* (2013.01); *H02K 3/12* (2013.01); *H02K 5/02* (2013.01)

(58) Field of Classification Search
CPC ............ H02K 3/28; H02K 1/165; H02K 3/12; H02K 5/02; H02K 3/525; H02K 1/145; H02K 5/225; H02K 7/14; H02K 11/33; H02K 21/145; F16K 31/0675; F25B 41/345

USPC ....................................................... 310/68 R
See application file for complete search history.

(56) References Cited

U.S. PATENT DOCUMENTS

| | | | |
|---|---|---|---|
| 2007/0035197 A1 | 2/2007 | Usui | |
| 2019/0234251 A1 | 8/2019 | Yokoyama | |
| 2022/0178599 A1* | 6/2022 | Van Delden | .......... F25B 41/345 |
| 2022/0181939 A1* | 6/2022 | Van Delden | ............. H02K 7/14 |

FOREIGN PATENT DOCUMENTS

| | | | |
|---|---|---|---|
| CN | 102916514 | * | 2/2013 |
| CN | 102916514 A | | 2/2013 |
| CN | 107820660 A | | 3/2018 |
| DE | 10 2004 015 541 A1 | | 10/2004 |
| EP | 1168576 | * | 1/2002 |

(Continued)

OTHER PUBLICATIONS

CN111188933 (Year: 2020).*

(Continued)

*Primary Examiner* — Ahmed Elnakib
(74) *Attorney, Agent, or Firm* — Fishman Stewart PLLC

(57) ABSTRACT

An electric stator for an expansion valve may include a first and a second coil body, a first electric connecting element, and a second electric connecting element. The first and second coil bodies may be substantially ring-shaped and extend along a circumferential direction. The first electric connecting element may protrude from the first coil body along an axial direction. The second electric connecting element may protrude from the second coil body. The first and second coil bodies may be arranged next to one another along the axial direction and may be fastened to one another via a common positioning aid.

20 Claims, 4 Drawing Sheets

(56) References Cited

FOREIGN PATENT DOCUMENTS

| | | | |
|---|---|---|---|
| EP | 1359656 A1 * | 11/2003 | ............. H02K 1/145 |
| JP | 2007049844 A | 2/2007 | |
| JP | 2015067089 A | 4/2015 | |
| WO | WO-14/026922 A2 | 2/2014 | |

OTHER PUBLICATIONS

English abstract for DE-10 2004 015 541.
German Search Report for DE-102020215269.1.
Chinese Office Action dated Sep. 21, 2023 and Chinese Search Report dated Sep. 15, 2023 for Chinese Patent Application No. 2021114593341.

* cited by examiner

ELECTRIC STATOR FOR AN EXPANSION VALVE

CROSS-REFERENCE TO RELATED APPLICATION

This application claims priority to German Application No. DE 102020215269.1 filed on Dec. 3, 2020, the contents of which are hereby incorporated by reference in its entirety.

TECHNICAL FIELD

The present invention relates to an electric stator for an expansion valve as well as an expansion valve comprising such a stator.

BACKGROUND

Expansion valves are valves, which reduce the pressure of a fluid, which flows through, downstream by means of a local constriction of a flow cross section, and thus effect a volume increase or expansion, respectively. In air conditioning systems, in particular in motor vehicles, such an expansion valve reduces the pressure of a refrigerant. So-called electric expansion valves often comprise a stator and a rotor, which can be driven and thus rotated by means of electrically supplying current to the stator by means of magnetic interaction. The electric stator thereby often consists of two or more coil bodies, which can be assembled and on which a respective stator winding is arranged. Each stator winding thereby has two winding ends, which can be electrically connected to the two electric poles of an electric current supply via an electric connecting element.

The rotatable rotor, in turn, is drivingly connected to a valve body of the expansion valve, which can thus be adjusted between an open position and a closed position. The above-mentioned flow cross section can be varied and the desired pressure reduction can thus also be set by means of an adjustment into open or closed position or an intermediate position between open and closed position.

For an optimal drive connection between stator and rotor—by means of magnetic interaction—it is required that the two or more stator windings of the stator are positioned precisely to one another, also to ensure that the magnetic field generated by the stator in response to electrically supplying current has the desired field line progression.

SUMMARY

It is thus an object of the present invention to create an improved embodiment for an electric stator for an expansion valve, which takes the above-described set of problems into account. In particular, a stator is to be created, in the case of which the coil bodies can be positioned precisely relative to one another with the respective stator winding by adhering to particularly low tolerances.

This object is solved according to the invention by means of the subject matter of the independent patent claims. Advantageous embodiments are subject matter of the dependent patent claims.

It is thus the basic idea to equip a stator comprising two stator bodies, on which a stator winding, which can be electrically supplied with current, is arranged in each case, with a common positioning aid, by means of which the two stator bodies can be positioned precisely relative to one another—in particular in a lateral plane perpendicular to an axial direction, along which the two stator bodies are mounted to one another. By means of the positioning aid, the two coil bodies can thus be fastened to one another relative to one another laterally by adhering to a particularly low tolerance.

The field line progression of the magnetic (stator) field generated by the two stator windings in response to electrically supplying current can be optimized in this way. This leads to an improved magnetic interaction of the magnetic stator field with the magnetic (rotor) field generated by the rotor. This effects an improved drive connection between stator and rotor.

An electric stator according to the invention for an expansion valve comprises a first and a second coil body, which is in each case essentially ring-shaped and extends along a circumferential direction. On each of the two coil bodies there is arranged a stator winding, which can be electrically supplied with current and which, when being electrically supplied with current, generates a magnetic field, which can interact with magnetic elements, which are provided at a rotor of the expansion valve, in order to drive the rotor in this way.

A first electric connecting element protrudes from the first coil body along an axial direction, which runs perpendicular to the circumferential direction. Accordingly, a second electric connecting element protrudes from the second coil body along the axial direction. The axial direction can preferably extend along a common central longitudinal axis of the two coil bodies, whereby the circumferential direction then revolves around this central longitudinal axis. A radial direction can extend perpendicularly away from the central longitudinal axis, whereby the radial direction then extends perpendicular to the axial direction as well as to the circumferential direction.

The two coil bodies of the stator according to the invention are arranged next to one another along the axial direction and, according to the invention, are fastened to one another by means of a common positioning aid. The two coil bodies can be aligned laterally relative to one another, thus with respect to a plane perpendicular to the axial direction. The two connecting elements are preferably flush with one another in the axial direction.

According to a preferred embodiment, the first connecting element is arranged axially offset from the first coil body and radially on the outside of the first coil body. In the case of this embodiment, the second connecting element is alternatively or additionally arranged axially offset from the second coil body and radially on the outside of the second coil body.

According to a preferred embodiment, the material of the first coil body or/and of the second coil body is a plastic. This embodiment simplifies the technical realization of the fastening of the two coil bodies to one another by means of a press fit.

Particularly preferably, the fastening of the coil bodies to one another is realized by means of a press fit. This press fit can be integrated in the positioning aid and can thus be part of the positioning aid. In other words, the positioning aid can form a press or interference fit, respectively. The use of a press fit allows for a permanently stable fastening of the two coil bodies to one another in a simple and thus cost-efficient manner.

According to a further preferred embodiment, the two connecting elements are arranged next to one another along the circumferential direction. This provides for a space-saving electric connection of the two coil windings to an external electric current source, in particular via one or two common electric current supply lines, respectively. Particularly preferably, the two connecting elements are connected to one another in a positive manner. This provides for a particularly stable mechanical arrangement of the two connecting elements and thus of the two coil bodies to one another.

According to an advantageous further development, the common positioning aid comprises at least one first extension, which protrudes axially from the first coil body and which is preferably formed in a pin-like or bolt-like manner, and engages with a second recess of the positioning aid, which is formed in a complementary manner to the first extension and which is arranged at the second coil body. In the case of this further development, the positioning aid alternatively or additionally comprises at least one second extension, which protrudes axially from the second coil body and which engages with a first recess of the positioning aid, which is formed in a complementary manner to the second extension, wherein the first recess is arranged at the first coil body. This alternative allows for a particularly cost-efficient production of the positioning aid, which is essential for the invention. When using said extensions and recesses, the above-mentioned press fit can additionally also be implemented in a simple manner—by means of suitable adaptation of the dimensioning of extension and assigned recess to one another.

Particularly advantageously, at least two, preferably a plurality, of first extensions and second recesses can be present. In the case of this variation, at least two, preferably a plurality, of second extensions and first recesses can alternatively or additionally be present. This variation ensures a particularly stable fixation of the two coil bodies to one another.

To ensure a consistently precise positioning of the two coil bodies to one another along the circumferential direction, the first extensions or the second recesses, respectively, are advantageously arranged along the circumferential direction, preferably equidistantly, at a distance from one another. In the case of this variation, the second extensions or the first recesses, respectively, can alternatively or additionally be arranged along the circumferential direction, preferably equidistantly, at a distance from one another.

According to another preferred embodiment, the first connecting element has an electrically insulating first connecting housing. The second connecting element likewise has an electrically insulating second connecting housing. Two electric connections, preferably made of a metal, which are connected in an electrically conductive manner to the stator winding of the coil body, which is assigned to the first connecting element, are arranged in the first connecting housing. Two electric connections, preferably made of a metal, which are connected in an electrically conductive manner to the stator winding of the coil body, which is assigned to the second connecting element, are arranged in the second connecting housing in an analogous manner. The electric connections can be connected to an electric current source, in order to electrically supply current to the two stator windings in this way.

According to another preferred embodiment, at least one guide fin, which extends in the axial direction and which engages with a recess, which is formed in a complementary manner to the guide fin and which likewise extends in the axial direction and which is provided at the second connecting housing, protrudes from the first connecting housing. It goes without saying that, in the alternative or in addition, it is conceivable to arrange the at least one guide fin at the second connecting housing, and the recess at the first connecting housing. To assemble the stator, the two coil bodies can initially be aligned axially at a distance laterally to one another by means of the guide fin and the recess, which is complementary thereto, so that the guide fin engages with the recess. This variation facilitates the alignment of the two coil bodies as part of the assembly to one another before the positioning aid can take effect.

The first coil body and the first connecting element are particularly preferably molded integrally to one another. In the case of this variation, the second coil body and the second connecting element are alternatively or additionally molded integrally to one another. Both variations, in particular in combination, significantly simplify the production of the stator, which results in cost advantages.

According to a further advantageous further development, a first pole sheet and a second pole sheet are attached to each of the two coil bodies, whereby the two pole sheets touch one another. The progression of the field lines of the magnetic (stator) field, which is generated by the two stator windings in response to electrically supplying current, is improved in this way. This, in turn, results in an improved coupling to the magnetic (rotor) field, which is generated by the rotor, whereby the drive connection between rotor and stator is improved.

According to another preferred embodiment, each of the two pole sheets has a ring-shaped base body. Several flap-like protrusions, which can be arranged along the circumferential direction, preferably equidistantly, at a distance from one another, protrude at an angle, preferably at a right angle, from each of the two base bodies along the axial direction. A respective recess is thereby formed between two protrusions, which are adjacent to one another in the circumferential direction. In the case of this variation, the protrusions of the first pole sheet abut against the outer circumference of the base body of the second pole sheet, and the protrusions of the second pole sheet abut against the outer circumference of the base body of the first pole sheet. This variation is associated with an optimized field line progression of the magnetic field, which is generated by the stator during operation.

The invention further relates to an expansion valve, in particular for an air conditioning system of a motor vehicle. The expansion valve according to the invention comprises a housing, which surrounds a housing interior. The expansion valve further comprises a rotor, which can be rotated relative to the housing. For this purpose, the rotor can be rotatably mounted on the housing. An above-introduced stator according to the invention is arranged in the housing interior—in a stationary manner with respect to the housing. The above-described advantages of the stator according to the invention thus transfer to the expansion valve according to the invention.

According to a preferred embodiment of the expansion valve according to the invention, at least one guide element, which can in particular be formed as at least one guide rail, is present at the housing for guiding the first or/and second of a connecting element or the first or/and second connecting housing, respectively, along the axial direction. This embodiment facilitates the mounting of the assembled stator in the expansion valve.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations, or alone, without leaving the scope of the present invention.

BRIEF DESCRIPTION OF THE DRAWINGS

Preferred exemplary embodiments of the invention are illustrated in the drawings and will be described in more detail in the following description, whereby identical reference numerals refer to identical or similar or functionally identical components.

In each case schematically.

DETAILED DESCRIPTION

Figure 1:
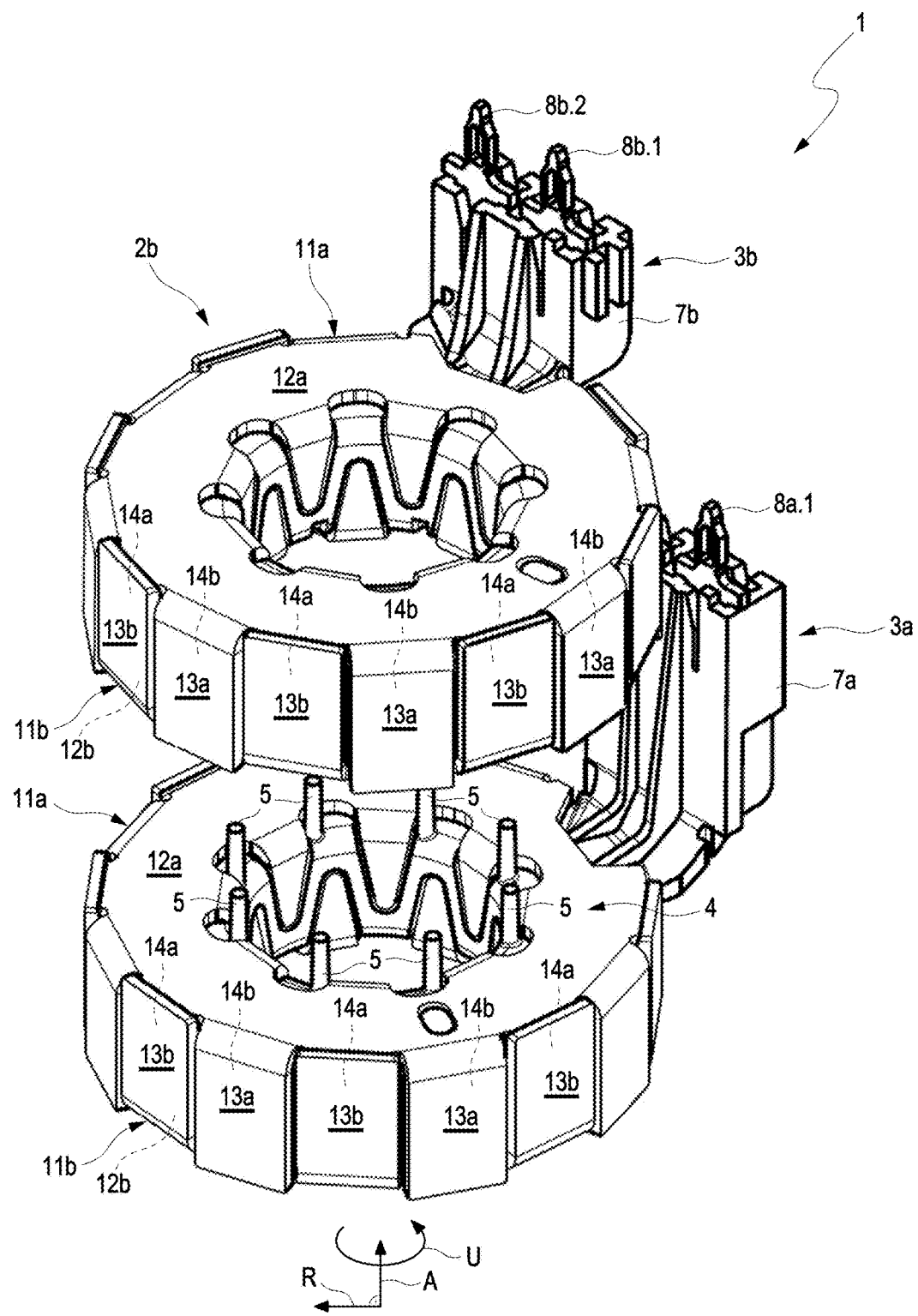
FIG. 1 shows a perspective exploded illustration of a stator according to the invention in a non-mounted state.
Figure 2:
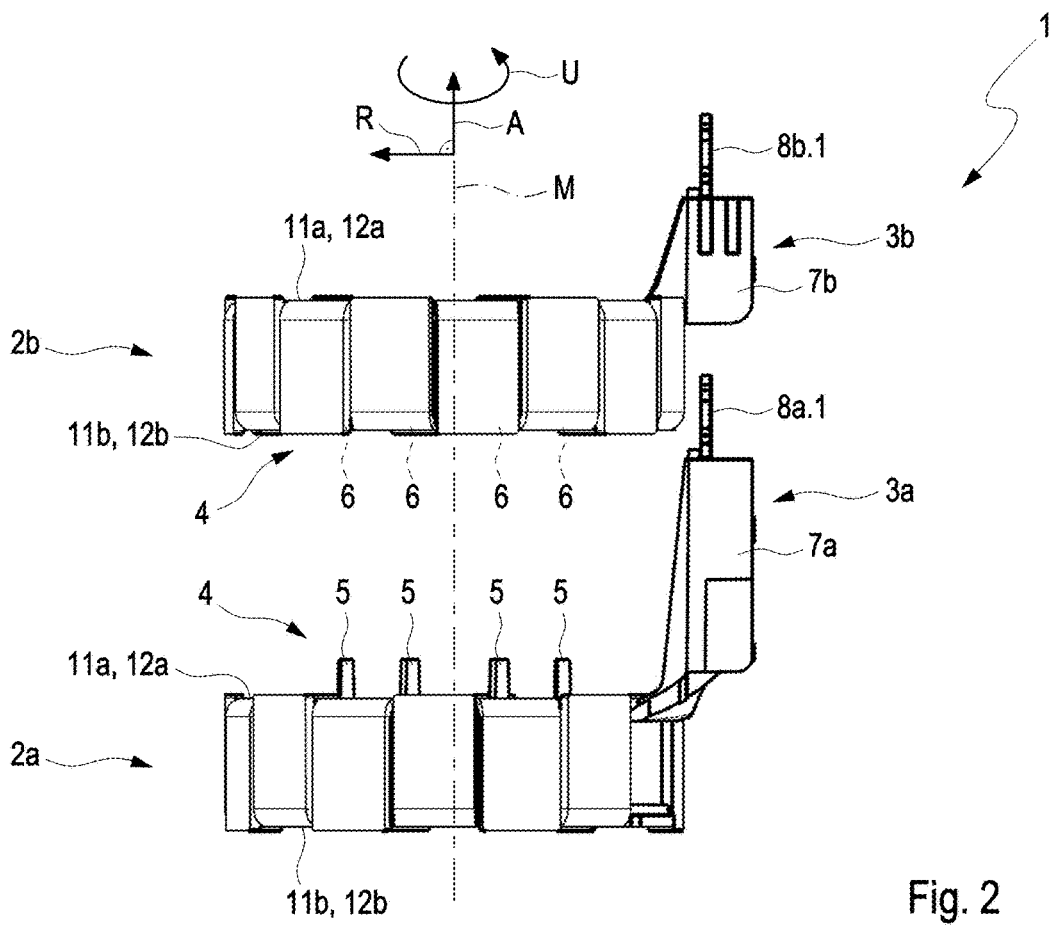
FIG. 2 shows the stator of FIG. 1 in an (exploded) side view.
Figure 3:
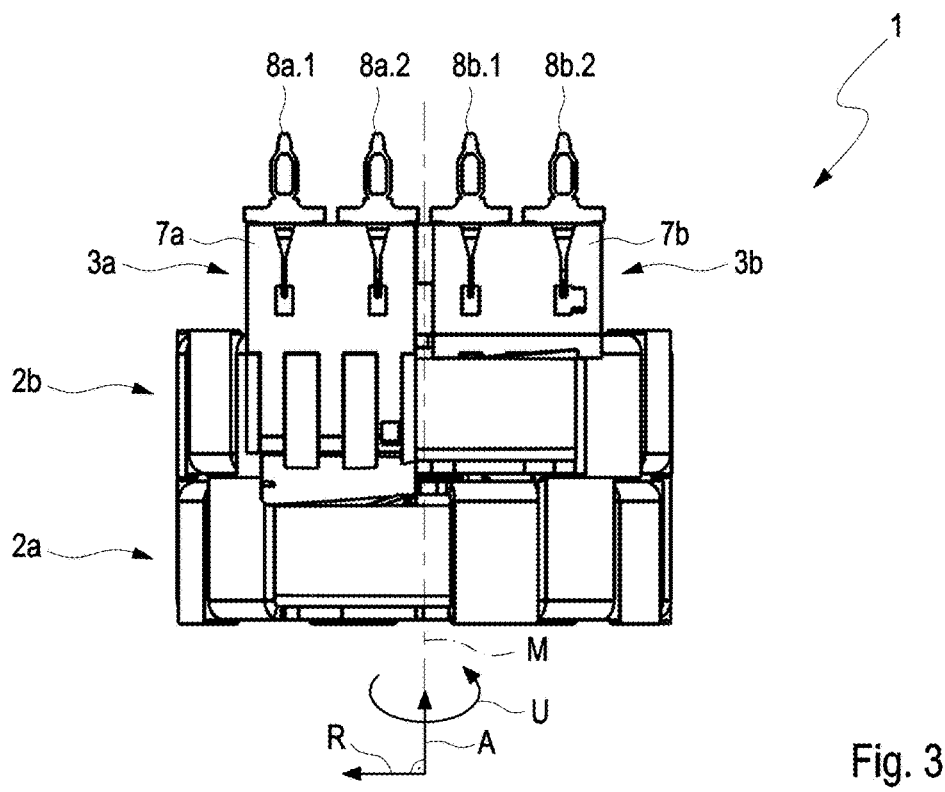
FIG. 3 shows the stator of FIG. 2 in an assembled state in a different side view.

FIG. 1 illustrates an electric stator 1 according to the invention in an exemplary manner in perspective exploded illustration, which reflects a non-assembled state of the stator 1, FIG. 2 illustrates the example of FIG. 1 in a side view. FIG. 3 shows the stator 1 of FIGS. 1 and 2 after assembly has taken place in a side view, which is oriented differently compared to the illustration of FIG. 2.

According to FIGS. 1 to 3, the stator 1 comprises a first and a second coil body 2a, 2b, which is in each case essentially ring-shaped and which extends along a circumferential direction U. A stator winding (not shown), which can be electrically supplied with current, is arranged on each coil body 2a, 2b. The material of the first coil body 2a and of the second coil body 2b is a plastic in each case. The same or different plastic material can be used for the two coil bodies 2a, 2b.

An axial direction A extends along a central longitudinal axis M of the first or second coil body 2a, 2b (see FIG. 2, 3). A circumferential direction U runs perpendicular to the axial direction A around the central longitudinal axis M of the stator 1 (see FIGS. 2 and 3). A radial direction R extends perpendicularly away from the central longitudinal axis M. The radial direction R moreover extends perpendicular to the axial direction A as well as to the circumferential direction U.

A first electric connecting element 3a protrudes from the first coil body 2a along the axial direction A. A second electric connecting element 3b analogously protrudes from the second coil body 2b along the axial direction A. The two connecting elements 3a, 3b are flush with one another in the axial direction A, as shown in FIG. 3. The two coil bodies 2a, 2b are arranged next to one another along the axial direction A and are fastened to one another. The two connecting element 3a, 3b are arranged next to one another with respect to the circumferential direction U and can abut against one another. The first connecting element 3a is arranged offset from the first coil body 2a along the axial direction A, and is arranged radially on the outside of the first coil body 2a with respect to the radial direction R. The second connecting element 3b is arranged offset from the second coil body 2b along the axial direction A, and is arranged radially on the outside of the second coil body 2b with respect to the radial direction R.

According to FIGS. 1 and 2, the two coil bodies 2a, 2b are fastened to one another by means of a common positioning aid 4, by means of which the two coil bodies 2a, 2b are aligned precisely relative to one another for fastening to one another laterally, thus in a plane perpendicular to the axial direction A.

In the example scenario, the positioning aid 4 comprises several first extensions 5, which in each case protrude axially from the first coil body 2a and which are formed in a pin- or bolt-like manner, respectively, which in each case engage with a second recess 6 of the positioning aid 4, which is formed in a complementary manner to the first extension 5, whereby the second recess 6 is arranged at the second coil body 2b. The first extensions 5 or the second recesses 6, respectively, are arranged along the circumferential direction U, preferably equidistantly, at a distance from one another at the first or second coil body 2a, 2b, respectively. The first extensions 5 are advantageously molded integrally to the first coil body 2a, i.e. the first coil body 2a and the first extensions 5 are formed in one piece and of the same material. In a non-illustrated alternative variation, the extensions can be provided at the second coil body, and the recesses at the first coil body 2a. A combination of both alternatives is also conceivable, for example in that extensions and recesses are arranged at both coil bodies 2a, 2b so as to alternative along the circumferential direction U.

The fastening of the coil bodies 2a, 2b to one another is realized by means of a press fit, which can preferably be part of the positioning aid 4. For this purpose, the diameters of the pin- or bolt-like extensions 5, respectively, can be selected to be slightly larger in a direction perpendicular to the axial direction A than the diameters of the recesses 6, which are complementary thereto. By axially inserting the extensions 6 into the recesses 5, the desired press fit is then generated.

As illustrated by FIGS. 1 to 3, the first and second connecting element 3a, 3b have a respective first or second electrically insulating connecting housing 7a, 7b, respectively, in which two electrically conductive connections 8a.1, 8a.2, 8b.1, 8b.2, in each case preferably made of a metal, are arranged in each case. The electric connections 8a.1, 8a.2, 8b.1, 8b.2 are connected in an electrically conductive manner to the stator winding of the coil body 2a, 2b (not shown), which is assigned to the respective connecting element 3a, 3b. The two stator windings can thus be electrically supplied with current, in that the electric connections 8a.1, 8a.2, 8b.1, 8b.2 are electrically connected to an electric current source.

An electrically insulating plastic can be used as electrically insulating material of the two connecting housings 7a, 7b. In particular, the same plastic material can be used as in the case of the two coil bodies 2a, 2b. It lends itself in this case to integrally mold the first coil body 2a and the first connecting housing 7a to one another. Accordingly, the second coil body 2b and the second connecting housing 7b can be molded integrally to one another.

Figure 4:
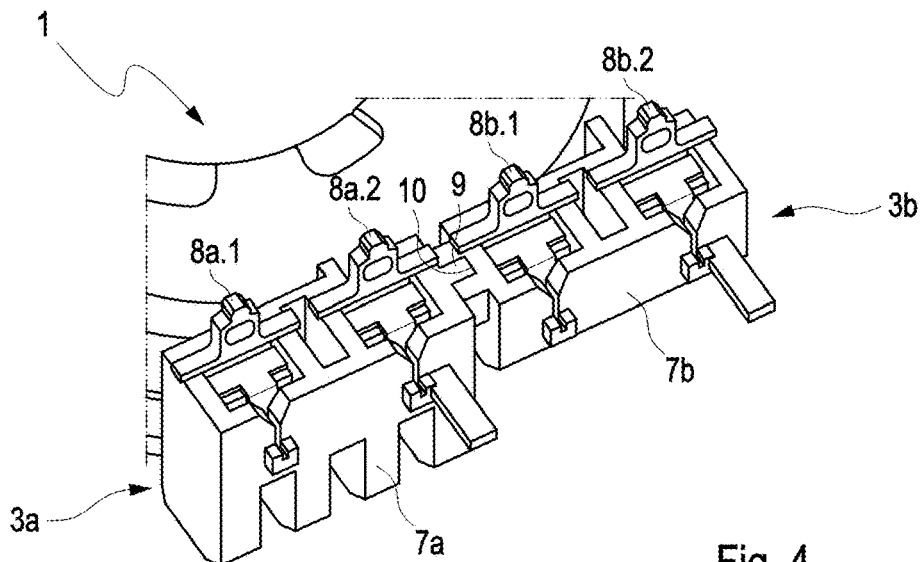
FIG. 4 shows the stator in the region of the two connecting elements in perspective illustration.

FIG. 4 shows the stator 1 in the region of the two connecting elements 3a, 3b in perspective illustration. As can be seen directly, a guide fin 9, which engages with a recess 10, which is formed in a complementary manner to the guide fin 9 and which is provided at the second connecting housing 7b, protrudes from the first connecting housing 7a.

As part of the mounting of the stator 1 and the associated fastening of the two coil bodies 2a, 2b to one another, the two coil bodies 2a, 2b can be arranged axially at a distance from one another, and the guide fin 9 can thereby be arranged in the recess 10. The arrangement of the two connecting housings 7a, 7b takes place in such a way that the guide fin 9 and the recess 10 extend along the axial direction A. Moreover, a positive connection of the two connecting elements 3a, 3b to one another is also realized in this way.

Moreover, a lateral pre-positioning of the two coil bodies 2a, 2b and of the two connecting elements 3a, 3b takes place in a plane perpendicular to the axial direction A. After this pre-positioning, the first coil body 2a can be moved axially towards the second coil body 2b—or vice versa or both—until, by forming said press fit, the extensions 5 are inserted into the recesses 5 to the extent that the desired fastening of the two coil bodies 2b, 2b to one another is realized. It goes without saying that in a non-illustrated alternative variation, the guide fin 9 can be arranged at the second connecting housing 7b, and the recess 10 at the first connecting housing 7a.

As can be seen from FIGS. 1 to 3, a first pole sheet 11a and a second pole sheet 11b, in each case made of a metal, is attached to each of the two coil bodies 2a, 2b. Each of the two pole sheets 11a, 11b has a ring-shaped base body 12a, 12b, from which several protrusions 13, 13b, which are formed in a tab-like manner and which are arranged along the circumferential direction U equidistantly at a distance from one another, protrude at a right angle in the axial direction A. A recess 14a, 14b is thereby in each case formed between two protrusions 13a, 13b, which are adjacent to one another in the circumferential direction U. The protrusions 13a of the first pole sheet 11a abut against the outer circumference of the base body 12b of the second pole sheet 11b, and the protrusions 13b of the second pole sheet 11b abut against the outer circumference of the base body 12a of the first pole sheet 11a. The two pole sheets 11a, 11b thus touch one another. The magnetic flux generated by the stator windings in response to electrically supplying current is optimized in this way.

Figure 5:
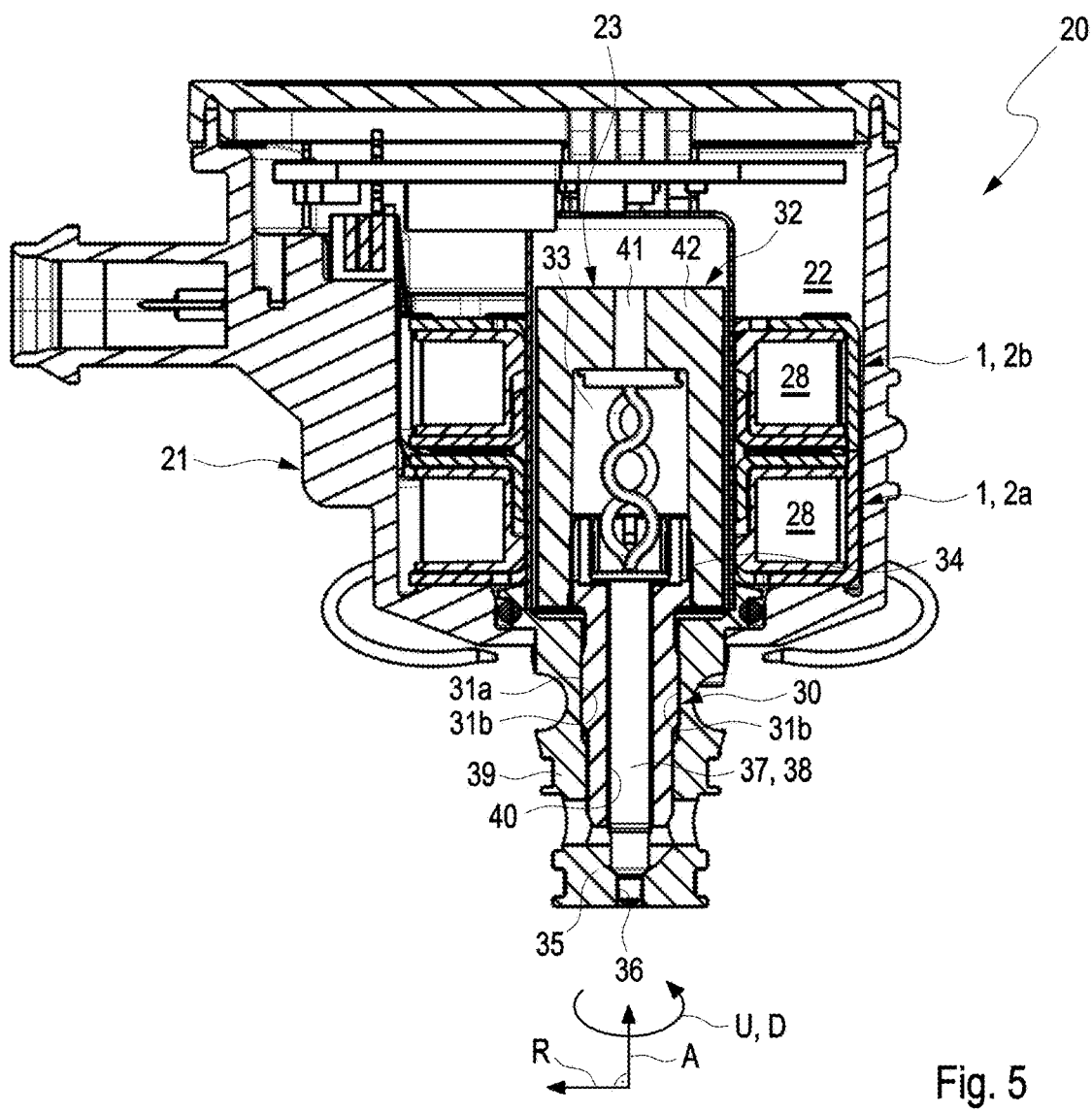
FIG. 5 shows an example of an expansion valve according to the invention comprising a stator according to the invention in a longitudinal section.

FIG. 5 shows an expansion valve 20 according to the invention in a longitudinal section along the axial direction A. The expansion valve 20 comprises a housing 21, which surrounds a housing interior 22.

As can be seen from FIG. 5, the expansion valve 20 comprises a rotor 23, which can be rotated relative to the housing 21, and a stator 1 according to the invention, which is arranged in a stationary manner at the housing 21. The rotor 23 can be formed of a pot-shaped permanent magnet body 32 of a magnetic or permanently magnetized material or can comprise such a permanent magnet body 32. A magnetic (stator) field, which interacts with the magnetic (rotor) field of the permanent magnet body 32 and thus generates a torque acting on the rotor 23, can be generated by means of suitable electrical supply of current to the two stator windings of the stator 1. The rotor 23 is driven in this way. In addition to the permanent magnet body 32, the expansion valve 20, as part of the rotor 23, comprises a threaded bush 30, which extends along an axial direction A and has an external thread 31, of the expansion valve 20.

According to FIG. 5, the threaded bush 30 is arranged in the housing interior 22. A valve body 37 of the expansion valve 20 is received in the threaded bush 30 so as to be adjustable along the axial direction A. The expansion valve 20 further comprises a permanent magnet body 32, which is formed in a pot-shaped manner and which is arranged in the housing interior 22 and is fixedly connected to the threaded bush 30. The permanent magnet body 32 is formed by means of a magnetic or magnetizable material, ferrite, or a rare earth element, which generates a permanent magnetic field. In the same way as the threaded bush 30, the permanent magnet body 32 is also a part of the rotor 23. The permanent magnet body 32 can have several magnetic elements, which are arranged next to one another along the circumferential direction U, comprising alternating north-south magnetization. The material of the threaded bush 30 can be a plastic or a metal, for example brass.

According to FIG. 5, the permanent magnet body 32 lengthens the threaded bush 30 along the axial direction A so that the valve body 37 is also partially received in a valve body receptacle 33, which is surrounded by the pot-shaped permanent magnet body 32. The permanent magnet body 32 thereby surrounds the threaded bush 30 radially on the outside with respect to the radial direction R in a common transition section 34. In this transition section 34, an inner circumferential side of the permanent magnet body 32 abuts firmly against an outer circumferential side of the threaded bush 30. In the transition section 34, the permanent magnet body 32 is thereby firmly connected to the threaded bush 30 by means of frictional connection, substance-to-substance bond, or positive connection. A combination of two or of all three of the mentioned connection types is also conceivable. A positive connection can be realized, for example, by means of a non-round threaded bush 30 and a negative contour, which is formed in a complementary manner thereto, in the permanent magnet body 32. A substance-to-substance bond can be realized by means of an adhesive connection. A frictional connection can be realized by means of a knurling, which is provided on the outer circumference of the threaded bush 30 or on the inner circumference of the permanent magnet body 32.

The expansion valve 20 according to FIG. 5 further comprises a valve seat 35, which is firmly connected to the housing 21 and which encloses a valve opening 36, which is connected in a fluid-tight manner in a closed position by means of the valve body 37 or a valve needle 38 of the valve body 37, respectively, and which can be released for being flown through with a fluid—for instance, a refrigerant—in an open position.

According to FIG. 5, an internal thread 31b, which is formed in a complementary manner to the external thread 31a of the threaded bush 30, is formed at a bush guide 39, which is present at the valve seat 35. The internal thread 31b engages with the external thread 31a and interacts with the external thread 31a in such a way that a rotational movement of the threaded bush 30 along the direction of rotation D, thus along the circumferential direction U and perpendicular to the axial direction A, effects an adjustment of the vale body 6 along the axial direction A relative to the valve seat 35 or to the bush guide 39, respectively—and thus also relative to the housing 21.

The external thread 31a at the threaded bush 30 and the corresponding internal thread 31b at the permanent magnetic body 32 can thereby generally be viewed analogously to a worm gear comprising a threaded spindle and an engagement element (for example nut) operatively connected thereto, in the case of which a rotatory movement of the threaded spindle is converted into a translatory movement of the engagement element. Such threaded spindles consist of a threaded rod, thus a cylindrical round bar, onto which a trapezoidal, sharp, flat thread or another thread is applied in the case of simple applications.

According to FIG. 5, the threaded bush 30 can be formed as hollow shaft comprising a passage opening 40, which extends axially and in which the valve body 37 is arranged with the valve needle 38 in an axially adjustable manner between a closed position and an open position. FIG. 5 shows the valve body 37 in its closed position, in which it closes the valve opening 36 in a fluid-tight manner.

The valve opening 36, the passage opening 40, the valve body receptacle 33, and an aperture 41 provided in a pot base 42 of the pot-shaped permanent magnet body 32, are part of a refrigerant duct, through which a refrigerant can flow.

A rotation of the rotor 23 along the direction of rotation D with respect to the stator 1 takes place in order to adjust the valve body 37 or the valve needle 38, respectively, in the axial direction A and thus in order to open or close, respectively, the expansion valve 20 according to the invention. The rotation of the rotor 23 is effected by means of a corresponding electrical supply of current to the stator 1 or the stator windings 28 thereof, respectively. The magnetic field generated thereby interacts with the magnetic field generated by the permanent magnet body 32 or the magnetic elements thereof, respectively, whereby a torque is generated, which acts on the permanent magnet body 32, which can be rotated along the direction of rotation D.

In response to a rotation of the rotor 23, an axial adjustment of the threaded bush 30 together with permanent magnet body 32 takes place by means of the above-described interaction of external thread 31a and internal thread 31b, whereby the valve body 37 is pushed onto the valve seat 35 or is lifted off the latter. If a rotation of the rotor 23 takes place in the direction of rotation D, the permanent magnet body 32 and thus also the threaded bush 30 are adjusted downward along the axial direction A according to FIG. 5 into a closed position of the expansion valve 20. If, in contrast, the rotor 23 is rotated opposite to the direction of rotation D, the permanent magnet body 32 and thus also the threaded bush 30, are adjusted upwards along the axial direction A according to FIG. 5, top, into an open position of the expansion valve 20.

Figure 6:
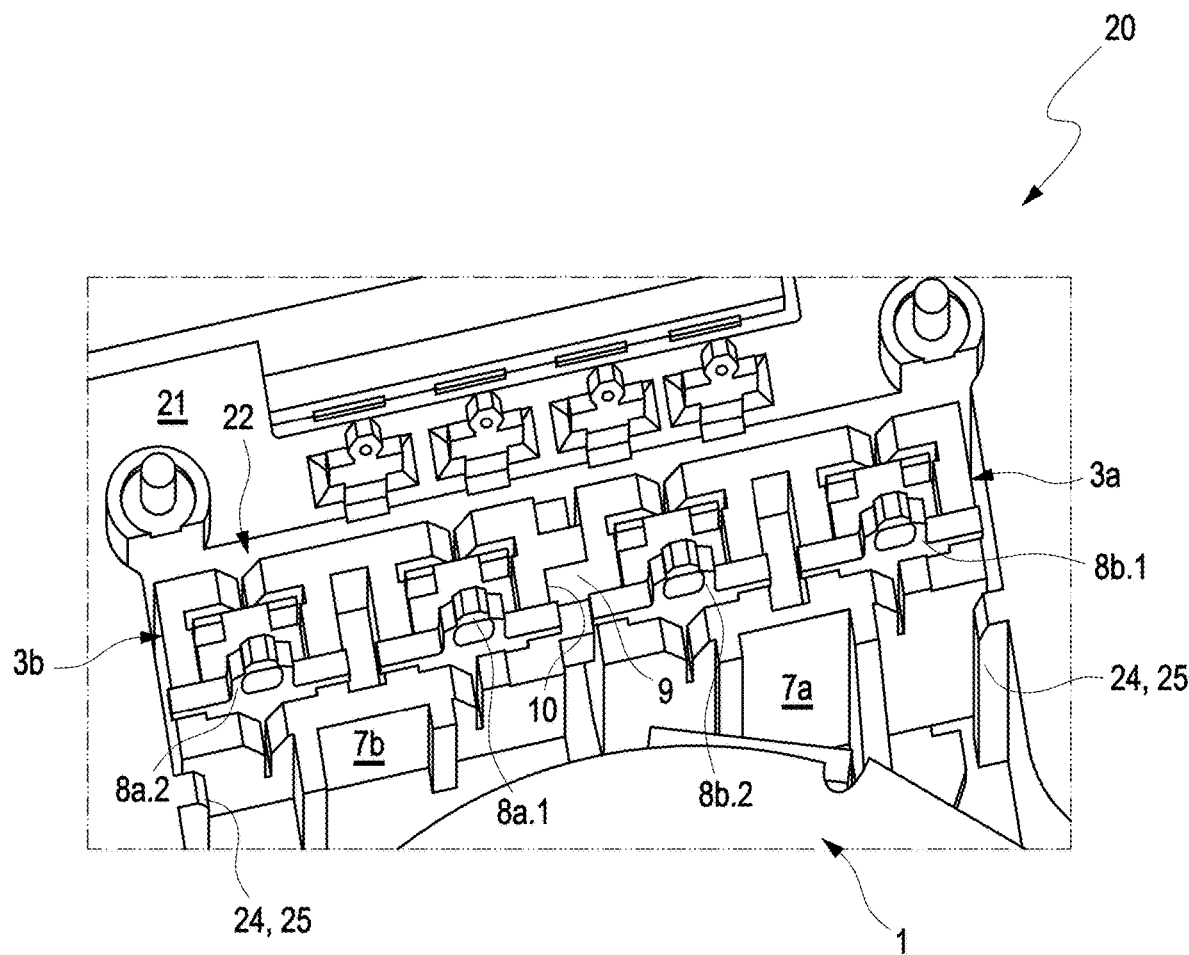
FIG. 6 shows the two connecting elements of FIG. 4 when the stator is mounted in the housing interior of the expansion valve.

FIG. 6 corresponds to the illustration of FIG. 4, but shows the two connecting elements 3a, 3b or the connecting housings 7a, 7b thereof, respectively, when the stator 1 is mounted in the housing interior 22.

As illustrated by FIG. 6, two guide elements 24, which are in each case formed as guide rail 25, can be molded integrally to the housing 21 of the expansion valve 20 for guiding the two connecting housings 7a, 7b during the axial fastening to one another.

The invention claimed is:

1. An electric stator for an expansion valve, comprising:
   a first coil body and a second coil body which are substantially ring-shaped and extend along a circumferential direction, each of the first and second coil body including a stator winding arranged thereon which can be electrically supplied with current;
   a first electric connecting element protrudes from the first coil body along an axial direction which runs perpendicular to the circumferential direction;
   a second electric connecting element protrudes from the second coil body;
   wherein the first and second coil bodies are arranged next to one another along the axial direction and are fastened to one another via a common positioning aid; and
   wherein the first and second connecting elements are arranged next to one another along the circumferential direction and are connected to one another in a positive manner.

2. The stator according to claim 1, wherein
   the first connecting element is arranged axially offset from the first coil body and radially on the outside of the first coil body; and/or
   the second connecting element is arranged axially offset from the second coil body and radially on the outside of the second coil body.

3. The stator according to claim 1, wherein the first coil body and/or the second coil body comprise a plastic.

4. The stator according to claim 1, wherein the first and second coil bodies are fastened to one another via a press fit which is part of the positioning aid.

5. The stator according to claim 1, wherein the first connecting element comprises a guide fin and the second connecting element comprises a recess, wherein the guide fin engages into the recess.

6. The stator according to claim 1, wherein
   the positioning aid comprises at least one pin-like or bolt-like first extension which protrudes axially from the first coil body and which engages with a second recess which is formed in a complementary manner to the first extension and which is arranged at the second coil body; and/or
   the positioning aid comprises at least one second extension which protrudes axially from the second coil body and which engages with a first recess which is formed in a complementary manner to the second extension and which is arranged at the first coil body.

7. The stator according to claim 6, wherein
   at least two of first extensions and second recesses are present; and/or
   at least two of second extensions and first recesses are present.

8. The stator according to claim 7, wherein
   the first extensions or the second recesses are arranged along the circumferential direction equidistant from one another; and/or
   the second extensions or the first recesses are arranged along the circumferential direction equidistant from one another.

9. The stator according to claim 1, wherein the first and second connecting element have a respective electrically insulating first or second connecting housing, in which two electrically conductive connections are made of a metal and which are connected in an electrically conductive manner to the stator winding of the first and second coil bodies.

10. The stator according to claim 9, wherein at least one guide fin extends axially and engages with a recess, the recess is formed in a complementary manner to the guide fin and extends axially and is provided at the second connecting housing and protrudes from the first connecting housing, or is provided at the first connecting housing and protrudes from the second connecting housing.

11. The stator according to claim 9, wherein
   the first coil body and the first connecting element are molded integrally to one another; and/or
   the second coil body and the second connecting element are molded integrally to one another.

12. The stator according to claim 1, wherein a first pole sheet and a second pole sheet are attached to each of the first and second coil bodies, and wherein the first and second pole sheets are in contact.

13. The stator according to claim 12, wherein
   each of the first and second pole sheets has a ring-shaped base body from which several flap-like protrusions are arranged along the circumferential direction, equidistantly from one another, the protrusions protrude at a right angle along the axial direction, so that a respective recess is formed between two protrusions which are adjacent to one another in the circumferential direction; and the protrusions of the first pole sheet abut against the outer circumference of the base body of the second pole sheet, and the protrusions of the second pole sheet abut against the outer circumference of the base body of the first pole sheet.

14. An expansion valve for an air conditioning system of a motor vehicle, comprising:

a housing surrounding a housing interior;

a rotor which can be rotated relative to the housing; and a stator arranged in the housing interior, the stator including:

a first coil body and a second coil body which are substantially ring-shaped and extend along a circumferential direction, each of the first and second coil body including a stator winding arranged thereon which can be electrically supplied with current;

a first electric connecting element protrudes from the first coil body along an axial direction which runs perpendicular to the circumferential direction;

a second electric connecting element protrudes from the second coil body;

wherein the first and second coil bodies are arranged next to one another along the axial direction and are fastened to one another via a common positioning aid; and wherein at least one guide rail is present at the housing for guiding the first and/or second connecting element or a first and/or second connecting housing along the axial direction.

15. The expansion valve according to claim 14, wherein the first and/or second connecting housing of the first and/or second connecting element is composed of an electrically insulating plastic.

16. An electric stator for an expansion valve, comprising:

a first coil body and a second coil body that are substantially ring-shaped and extend along a circumferential direction, each of the first coil body and the second coil body including a stator winding arranged thereon that can be electrically supplied with current;

a first electric connecting element protruding from the first coil body along an axial direction that runs transversely to the circumferential direction;

a second electric connecting element protruding from the second coil body;

wherein the first coil body and the second coil body are arranged next to one another along the axial direction and are secured to one another via a common positioning aid;

wherein the first connecting element and the second connecting element have a respective electrically insulating first or second connecting housing, in which two electrically conductive connections are connected in an electrically conductive manner to the stator winding of the first and second coil bodies; and wherein at least one guide fin extends axially and engages with a recess, the recess is formed in a complementary manner to the at least one guide fin and extends axially and is provided at the second connecting housing and protrudes from the first connecting housing, or is provided at the first connecting housing and protrudes from the second connecting housing.

17. The stator according to claim 16, wherein the first connecting element is arranged axially offset from the first coil body and radially on the outside of the first coil body.

18. The stator according to claim 16, wherein the second connecting element is arranged axially offset from the second coil body and radially on the outside of the second coil body.

19. The stator according to claim 16, wherein the first coil body and the second coil body comprise a plastic.

20. The stator according to claim 16, wherein the first coil body is fastened to the second coil body via a press fit.

* * * * *